United States Patent [19]

Hope et al.

[11] Patent Number: 5,053,295
[45] Date of Patent: Oct. 1, 1991

[54] LIGHTWEIGHT ELECTROCONDUCTIVE SOLDERLESS INTERNAL CELL CONNECTOR FOR ALKALINE OR ALKALINE EARTH METAL BATTERIES

[76] Inventors: Henry F. Hope; Stephen F. Hope, both of c/o Hope Industries, Inc., Willow Grove, Pa. 19090

[21] Appl. No.: 498,697

[22] Filed: Mar. 26, 1990

[51] Int. Cl.$^5$ ............................................. H01M 2/26
[52] U.S. Cl. .................................... 429/161; 429/211; 439/586
[58] Field of Search .................. 429/161, 211, 137; 439/586, 730, 733, 736; 428/461

[56] References Cited

U.S. PATENT DOCUMENTS

| | | | |
|---|---|---|---|
| 3,525,799 | 8/1970 | Ellis | 439/736 X |
| 4,463,055 | 7/1984 | Hodges | 428/461 X |
| 4,502,903 | 3/1985 | Bruder | 428/461 X |
| 4,675,258 | 6/1987 | McLoughlin et al. | 429/137 X |
| 4,684,583 | 8/1987 | Klinedinst et al. | 429/137 X |

*Primary Examiner*—Stephen J. Kalafut
*Attorney, Agent, or Firm*—Z. T. Wobensmith, III

[57] ABSTRACT

This invention is directed to a lightweight solderless connector for use as an internal cell connector in an alkaline metal or alkaline earth metal battery, wherein the connector includes a core of alkaline metal or alkaline earth metal such as lithium metal in flat foil form, which has been encapsulated inside a layer of insulating plastic film such as polyester or polypropylene, with an adhesive coating therebetween, which is preferably anhydrous adhesive.

8 Claims, 1 Drawing Sheet

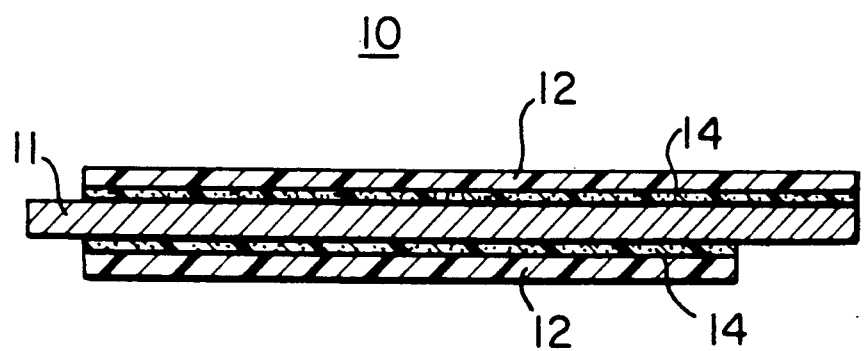
FIG.

LIGHTWEIGHT ELECTROCONDUCTIVE SOLDERLESS INTERNAL CELL CONNECTOR FOR ALKALINE OR ALKALINE EARTH METAL BATTERIES

BACKGROUND OF THE INVENTION

1. Field of the Invention

This invention relates to lightweight internal electroconductive connectors for solderless battery cell connection, which include a core of metal having an outer insulative adhesive coated plastic film.

2. Description of the Prior Art

Alakline metal or alkaline earth metal batteries are in demand due to the many advantages that they provide in terms of weight, and electrical characteristics.

Such batteries due to the sensitive nature of their components require special handling and require connector materials that are compatible with the materials used in battery construction. A particularly desirable material for battery construction is lithium metal, which is often used in the anode.

Connectors used inside the battery, particularly cell connectors, must possess good electrical conductivity characteristics as well as component compatibility, and be of light weight.

Batteries constructed of alkaline or alkaline earth metal contain alkaline metal foils or alkaline metal coated substrates and cathode material coated substrates as current collectors. The prior art connectors were difficult to apply, requiring excessive time to electroconductively connect battery current collectors and other components together, and to maintain good electroconductivity. In addition, the connectors were not light weight, which becomes important for ease of assembly when constructing large multiple cell batteries, such as those used to power electric vehicles.

It has been desired to use lightweight solderless connectors but until the present invention no satisfactory and practical connectors have been available.

SUMMARY OF THE INVENTION

It has now been found that a lightweight connector formed of a strip of lightweight alkaline metal foil, and preferably lithium, encased in a cover of insulating and reinforcing plastic tape, coated with an adhesive preferably of the anhydrous variety provides connectors having the desired properties.

The principal object of the invention is to provide an electrically conductive lightweight solderless connector that is useful for internal connection in alkaline or alkaline earth metal battery construction.

A further object of the invention is to provide a connector of the character aforesaid that is simple and inexpensive to construct and durable in use.

A further object of the invention is to provide a connector of the character aforesaid that has multiple applications.

A further object of the invention is to provide a connector of the character aforesaid that is compatible with many varieties of alkaline metal or alkaline earth metal batteries, and provides good electroconductively.

A further object of the invention is to provide a connector of the character aforsaid which is able to connect electroconductivity with carbon, graphite fiber and/or metal current collectors.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

The FIG. is a side elevational view of a lightweight connector constructed in accordance with the invention, and broken away to show the internal construction.

It should, of course, be understood that the description and drawings herein are illustrative merely, and that various modifications and changes can be made in the structure disclosed without departing from the spirit of the invention.

DESCRIPTION OF THE PREFERRED EMBODIMENT

Referring now more particularly to the drawings a lightweight connector 10 in accordance with the invention is therein illustrated. The connector 10 has a core 11 which in the preferred embodiment is lithium metal in foil form, but which can be of other alkaline metals or alkaline earth metals, compatible with the internal components of the battery (not shown) with which the connector is to be used.

The connector 10 has an outer covering 12 of an insulating plastic such as polyester or propylene plastic in film form. The covering 12 has an adhesive coating 14 thereon, in contact with said core 11 and which is preferably of an acrylic or rubber based anhydrous adhesive of well known type. The connector 10 can have the ends of core 11 in direct contact with the battery components (not shown) such as battery collectors.

The connector 10 is easily connected to the battery current components (not shown) by pressing it thereagainst so that it cold welds to the component and in a preferred embodiment the component contact area (not shown) can be roughened.

It will thus be seen that a lightweight connector for internal battery connection has been provided with which the objects of the invention are achieved.

We claim:

1. In combination with an alkaline metal or alkaline earth metal battery a lightweight solderless connector for internal battery electrical connection which comprises a core of alkaline metal or alkaline earth metal, an outer electrically insulating covering on said core, said outer covering having an adhesive coating thereon in contact with said core.

2. A lightweight solderless connector as defined in claim 1 in which said adhesive coating is anhydrous.

3. A lightweight solderless connector as defined in claim 1 in which said core is of lithium metal.

4. A lightweight solderless connector as defined in claim 1 in which said outer layer is of plastic.

5. A lightweight solderless connector as defined in claim 4 in which said plastic is polyester.

6. A lightweight solderless connector as defined in claim 2 in which said adhesive coating is an acrylic based anhydrous material.

7. A lightweight solderless connector as defined in claim 2 in which said adhesive coating is a rubber based anhydrous material.

8. A lightweight solderless connector as defined in claim 1 in which said connector is attached by applying pressure.

* * * * *

UNITED STATES PATENT AND TRADEMARK OFFICE
CERTIFICATE OF CORRECTION

PATENT NO. : 5,053,295
DATED : October 1, 1991
INVENTOR(S) : HENRY F. HOPE and STEPHEN F. HOPE It is certified that error appears in the above-identified patent and that said Letters Patent is hereby corrected as shown below:

Column 1

Line 64, "electroconductively" should be
- electroconductivity -

Line 67, "electroconductivity" should be
- electroconductively -

Column 2

Line 36, after "battery" and before "collectors" insert - current -

Signed and Sealed this

Nineteenth Day of January, 1993

*Attest:*

DOUGLAS B. COMER

*Attesting Officer*  Acting Commissioner of Patents and Trademarks